United States Patent [19]

Jenkins et al.

[11] Patent Number: 4,805,228

[45] Date of Patent: Feb. 14, 1989

[54] CELLULAR LOGIC PROCESSOR

[75] Inventors: Robert E. Jenkins, Laurel; D. Gilbert Lee, Jr., Columbia; Robert C. Moore, Laurel; Kim Strohbehn, Columbia, all of Md.

[73] Assignee: The Johns Hopkins University, Baltimore, Md.

[21] Appl. No.: 45,962

[22] Filed: May 4, 1987

[51] Int. Cl.[4] ............................................. G06K 9/44
[52] U.S. Cl. ...................................... 382/49; 382/41; 382/54; 382/27
[58] Field of Search .................... 382/27, 41, 49, 54; 364/131, 137

[56] References Cited

U.S. PATENT DOCUMENTS

| | | | |
|---|---|---|---|
| 4,003,024 | 1/1977 | Riganati et al. | 382/54 |
| 4,228,498 | 10/1980 | Moshier | 364/200 |
| 4,356,550 | 10/1982 | Katzman et al. | 364/200 |
| 4,398,176 | 8/1983 | Dargel et al. | 382/27 |
| 4,437,121 | 3/1984 | Taylor et al. | 382/46 |
| 4,441,207 | 4/1984 | Lougheed et al. | 382/49 |
| 4,506,382 | 3/1985 | Hada et al. | 382/41 |
| 4,675,803 | 6/1987 | Kendall et al. | 364/137 |

Primary Examiner—Leo H. Boudreau
Assistant Examiner—Donald J. Daley
Attorney, Agent, or Firm—Robert E. Archibald; Francis A. Cooch

[57] ABSTRACT

A cellular logic operation processor for performing transformations, according to a controlled sequence, of the data points of a first matrix into a corresponding number of data points of a second matrix. The processor includes a plurality of operably connected digital storage devices for temporarily and sequentially storing each neighborhood of data points from a first matrix, wherein a neighborhood of data points is comprised of a central data point and its surrounding data points in a matrix. The processor also includes a plurality of taps wherein each tap is electrically connected to a digital storage device such that the tap electrically indicates the state of the data point stored in the digital storage device. A look-up table is also provided having stored therein a plurality of transformation values which are individually addressable in accordance with the combined states indicated by the taps. The transformation value addressed in response to the combined states indicated by the taps is output by the processor as the transformation value of the central data points of the currently stored neighborhood.

40 Claims, 2 Drawing Sheets

CELLULAR LOGIC PROCESSOR

STATEMENT OF GOVERNMENT INTEREST

The Government has rights in this invention pursuant to Contract No. N00039-87-C-5301 awarded by the Department of the Navy.

BACKGROUND OF THE INVENTION

The present invention relates to digital data signal analyzers and more particularly to a digital data signal analyzer for performing a one to one transformation of all the data points in a first matrix to a second matrix.

In the areas of scientific research, image analysis, signal processing and the like, enormous amounts of data are produced. There is a critical need for sound, accurate and easy-to-use apparatus for analyzing these data. Often data are continually produced without stopping for such analysis. The result can be the production of large amounts of inferior data. Apparatus which would permit a user to study the mathematical patterns underlying the data would be of great help to determine the best next step in analysis and to draw meaningful conclusions from the data already gathered. Moreover, the studies offered by such an apparatus may reveal that better experimental designs can be devised and implemented effectively. Also, underlying properties of the data, not directly measurable, but related to the data being produced, may be studied, and predictions related to the scientific content of the data, and future data, become possible.

Cellular automata processors have been proposed as apparatus for satisfying the above described need for sound, accurate and easy-to-use apparatus for analyzing enormous amounts of data. Research in the application of cellular automata processors has been ongoing for some time and today is more active than ever. Interesting and promising new approaches based on cellular automata models have been proposed to solve a wide variety of physical and biological modeling problems, ranging everywhere from galactic structures to DNA sequences.

Early methods for performing data analysis involved the use of general purpose computers controlled by long and elaborate programs. The use of the general purpose computer in performing data analysis met with limited success due to the extremely long processing time required to process images with many data points or pixels. To overcome the extremely long processing times characteristic of the general purpose computer, special purpose processors were proposed which implement an algorithm, or formula specifically applicable to analyze data in the form of images. One controlled sequence or algorithm which lends itself to implementation by special purpose processors is called cellular logic operations. These special purpose processors consider the input data as an M by N array of 0s and 1s representing black or white picture elements. From the input array another M by N array is derived wherein each point in the second array is a function of the state of the equivalent point in the initial array and a neighborhood of points surround it. The derivation of the other M by N array according to the mathematical technique implemented by the special purpose processor is called a transformation. A series of these transforms may be performed to determine some of the characteristics of data patterns displayed in the initial array.

The following are representative of various prior art special purpose processors for performing data analysis: U.S. Pat. Nos. 4,167,728; 4,174,514; 4,484,346; 4,395,698; 4,464,788; and 4,369,430.

U.S. Pat. No. 4,167,728 discloses a serial chain of substantially identical neighborhood transformation modules. The image data, generally in the form of raster scan lines, is serially shifted through a neighborhood extraction portion in each stage for sequentially accessing substantially all of the neighborhoods in the image matrix. Depending on the states of the pixels contained in the neighborhood extraction portion, certain transformations are performed and the transformed output is passed on to the input of the succeeding stage. A central controller which is coupled to all of the stages defines all of the particular transformations to be performed in the stages.

U.S. Pat. No. 4,174,514 discloses a technique by which the image data are partitioned and fed through associated parallel processors making up each stage.

U.S. Pat. Nos. 4,395,698; 4,369,430; 4,464,788 and 4,484,346 generally disclose neighborhood transformation logic circuitry for an image analyzer system which employs one or more neighborhood transformation stages. The stages operate to access groups of neighboring pixels in an image matrix, analyze them and generate a transformation output as a result of their analysis. Each stage includes logic circuitry that is programmable from a central controller to control the transformation process.

The above described special purpose processors have various disadvantages. For example, serial chains of processors are simple in structure but are slow in processing speed. The addition of a central controller increases the complexity of serial processor chains and adds to the processing times. Parallel processors that operate on partitioned data have fast processing speeds but are highly complex in structure. Still further, algorithm circuitry must be replicated in every processor in a parallel processor system. Therefore, for reasonably large arrays, such as 1000×1000, the parallel processor system would be very large and costly.

The present invention solves the above described disadvantages by providing a fast, accurate, inexpensive and easy-to-use apparatus for analyzing data. The present invention can be used, for example, in systems for performing image analysis, pattern recognition, signal processing, and the like.

SUMMARY OF THE INVENTION

In accordance with the present invention a cellular logic operation (CLO) processor is provided for performing cellular logic operations. The CLO processor transforms, according to a prescribed or controlled sequence, data points or pixels of a first matrix into a corresponding number of data points of a second matrix.

The CLO processor includes a plurality of series connected digital storage devices for temporarily and sequentially storing each neighborhood of data points from a first matrix wherein a neighborhood of data points comprises a central data point and each data oint in thematrix surrounding the central data point. The CLO processor also includes a plurality of taps placed at various points along the digital storage devices wherein each tap is electrically connected to a digital storage device such that the tap electrically indicates the state of the data point stored in the digital storage device. In addition, the CLO processor includes a look-up table storage device having stored therein a plurality of transformation values which are individually addressable in accordance with a combination of the various states of the data points indicated by the taps. The transformation value addressed by the combined indicated states of the data points is output as the transformation value of the currently stored central data point. The addressed transformation value is sequentially placed in a second matrix in a location in a second matrix corresponding to the location of the currently stored central data point in the first matrix.

The CLO processor of the present invention is used in conjunction with a host computer that permits an operator to control the operation of the CLO processor, easily modify the transformation control sequence implemented by the CLO processor and store both the first and second matrix.

BRIEF DESCRIPTION OF THE DRAWINGS

These and other objects and advantages of the present invention will become apparent upon reading the following specification and by reference to the drawings in which.

DETAILED DESCRIPTION OF THE INVENTION

The present invention provides a cellular logic operation (CLO) processor for performing a one to one transformation of all data points or pixels having various states in a first matrix into a corresponding number of data points that constitute a second matrix. The CLO processor of the present invention is used in conjunction with a host computer which controls the operation of the CLO processor, supplies the CLO processor with each pixel from the first matrix and stores the output datum from the transformation. In addition, the host computer permits a user to easily change, vary or modify the sequence or algorithm, used by the CLO processor to perform the transformations.

Figure 1:
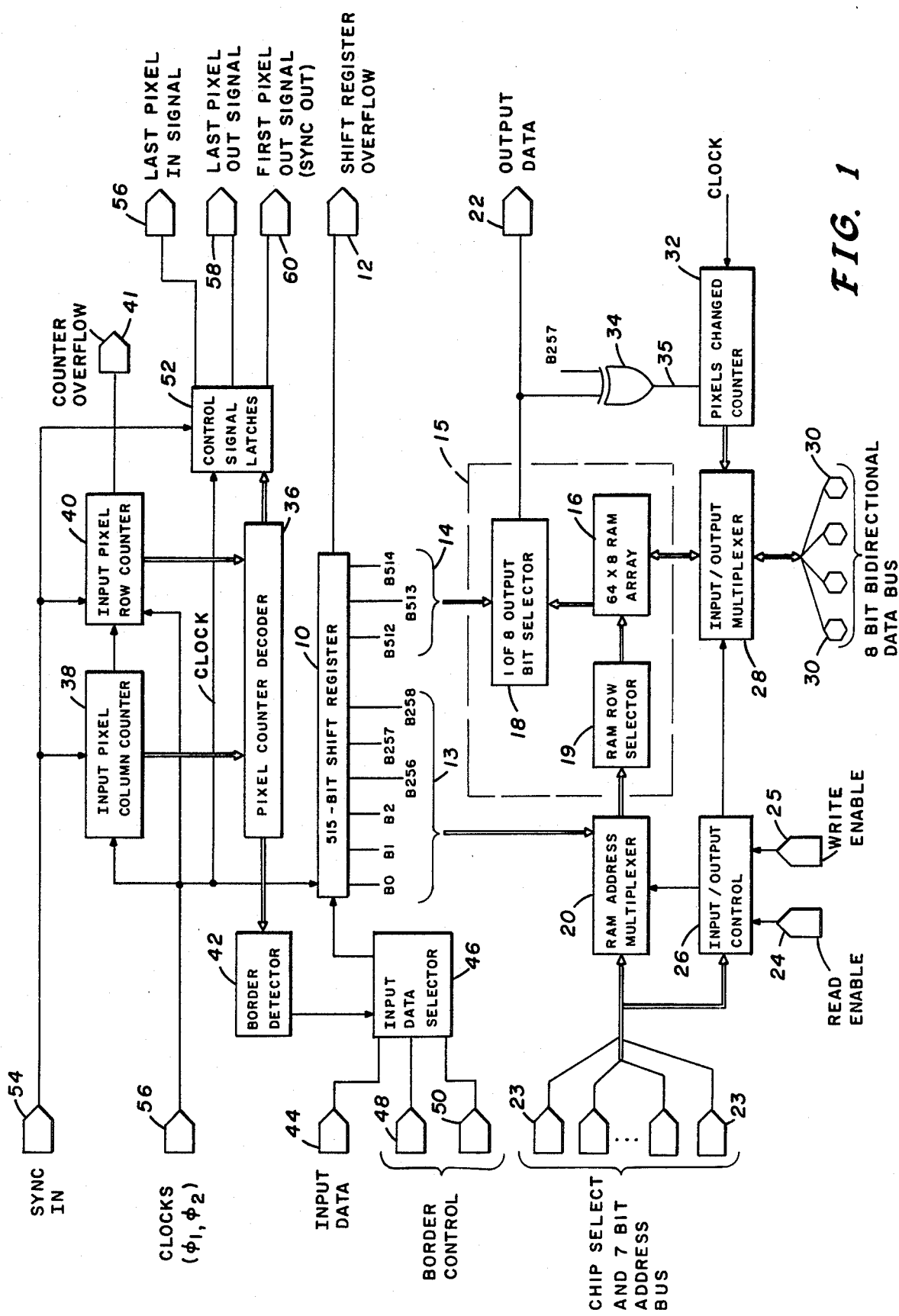
FIG. 1 is a block diagram of the major components of the system of the preferred embodiment of the present invention.

The CLO processor as shown in FIG. 1 is designed to handle a 256×256 pixel matrix or image and can be easily modified to accommodate a 512×512 pixel or larger matrix. In addition, a plurality of CLO processors can be cascaded in a pipeline to perform multiple cellular logic operations on an image.

Figure 2:
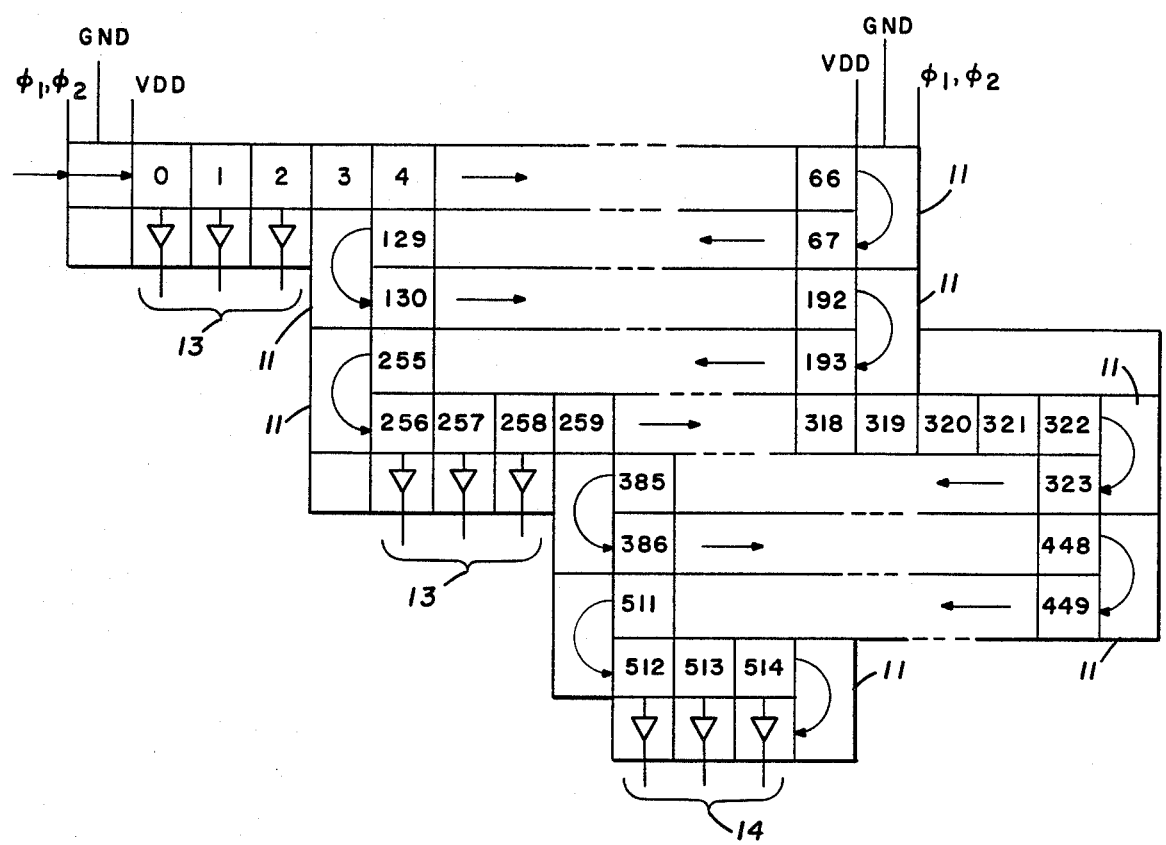
FIG. 2 is a block diagram of an integrated circuit layout of a component of the system of the preferred embodiment of the present invention.

The CLO processor as shown in FIG. 1 includes a shift register 10. The shift register 10 as further illustrated in FIG. 2 includes a plurality, 515 for this embodiment or more if a larger image is to be processed, of digital storage devices or bit positions which may be operably connected in series, parallel or any other arrangement. The embodiment of the shift register 10 illustrated in FIG. 2 shows the digital storage devices arranged in successive rows wherein the storage devices are connected in series. Continuity cells 11 are used to connect the ends of each row to the beginning of the subsequent row. The topography of the shift register 10, shown in FIG. 2, has been optimized for implementation in large scale integrated circuit technology. That is the serpentine nature of the 515 bit shift register 10 is such that the total area of the storage devices takes on a small, compact and somewhat square shape, and the critical storage devices appear at positions on one edge for easy access.

The digital storage devices have sequentially shifted therein each data point or pixel input from a first matrix. The shift register 10 also includes a shift register overflow line 12 which provides a shift register overflow signal indicating whether the pixels of the matrix have exceeded the 515 bit positions or digital storage devices provided by the shift register 10. A plurality of taps generally shown at 13 and 14 of FIGS. 1 and 2 are electrically connected at various bit positions along the digital storage devices such that each tap electrically indicates the state of the data point stored in the associated digital storage device or bit position within the shift register 10. The taps 13 and 14, as further illustrated in FIG. 2, are electrically connected at bit positions representative of a neighborhood of data points of the first matrix. A neighborhood includes a central data point and a plurality of data points which surround the central data point. The present invention operates on a 3×3 data point neighborhood which includes nine data points. The first matrix is shifted through the shift register 10 such that each neighborhood is sequentially accessed and each central data pint sequentially appears at the appropriate central data point tap which is at bit position 257 of the shift register 10.

The taps are placed at bit positions 0, 1, 2, 256, 257, 258, 512, 513, and 514, which due to the layout of the shift register 10, represent the 9 data points or pixels of the 3×3 data point neighborhood. Each tap and bit position shall henceforth be identified by a letter B in front of the tap or bit position number; for example, tap and bit position 257 shall be identified as B257. The nine taps or bits generally shown at 13 and 14, having thereon the electrically indicated states of each data point in the currently stored neighborhood, are combined to form an address which is used to address a particular transformation value in a look-up table 15.

The look-up table 15 includes a 64×8 random access memory (RAM) 16, a 1-of-8 bit selector 18 and a RAM row selector 19. By combining the 64×8 RAM 16 with the 1-of-8 bit selector 18 and the RAM row selector 19, a 512×1 look-up table is formed containing a plurality (512) of individually addressable transformation values. The transformation values stored in the 64×8 RAM 16 are used to replace each central data point of the first matrix as they are sequentially shifted through B257.

Transformation values are obtained from the 64×8 RAM 16 by use of the RAM row selector 19 and the 1-of-8 bit selector 18. The six taps B0, B1, B2, B256, B257, and B258, generally shown at 13, are combined to form a row address that is applied to a RAM address multiplexer 20. The RAM address multiplexer 20 is used to select whether a row address from the host computer is applied to the look-up table 15 or a row address from the CLO processor, namely the six taps, are applied to the look-up table 15. When the CLO processor row address is selected by the RAM address multiplexer 20, the states indicated on the six taps 13 are combined to form an address that is supplied to the RAM row selector 19, which in turn addresses or accesses one of the 64 rows of the 64×8 RAM 16. Each of the 64 rows contains 8 individual bits of data which when addressed or accessed, are immediately output to the 1-of-8 bit selector 18. The taps B512, B513 and B514, generally shown at 14, are combined to form a column address which is applied to the 1-of-8 bit selector 18 to select one of the 8 bits as the transformation value.

The selected bit is the transformation value of the central data point currently stored in bit position B257. This transformation value is output on output line 22 as a replacement data point, which is sequentially placed in the second matrix in a location corresponding to the location in the first matrix of the central data point currently stored in bit position B257.

Row addresses from the host computer are supplied to chip select and address bus (CSAB) 23 which in turn supplies each row address to RAM address multiplexer 20. The CSAB 23 includes an address bus which permits an address from the host computer to be applied to the apparatus and circuitry which permit the host computer to access or address a particular CLO processor in a system where a plurality of CLO processors are cascaded in a pipeline.

As stated above, provisions are made in the CLO processor to permit the host computer to modify the control sequence or algorithms used by the CLO processor to perform the transformations. Since the control sequence and algorithms are implemented by use of the look-up table, they are modified by permitting the host computer tohave access to the contents of the look-up table. The contents of the look-up table are accessed by the host comptuer by causing the RAM address multiplexer 20 to select as an input to the RAM row selector 19 a row address from the host computer as opposed to a row address from the CLO processor.

Whether memory locations are read or written into is controlled by the host computer using read and write enable lines 24 and 25 respectively and input/output (I/O) control 26. When the write enable line 25 is asserted, I/O control 26 causes the RAM address multiplexer 20 to select the row address from the host computer. In addition, the I/O control 26 causes input/output (I/O) multiplexer 28 to select as an input the data appearing on 8 bit bi-directional data bus 30. Accordingly, the row address from the host computer is applied to the RAM row selector 19 which selects, based on the row address, one of the 64 rows of 8 bit data in the 64×8 RAM 16. Data from the host computer appearing on the 8 bit bi-directional data bus 30, through the I/O multiplexer 28, is written into the selected row of the 64×8 RAM 16. When the read enable line 24 is asserted, I/O control 26 causes the RAM address multiplexer 20 to select the row address from the host computer. In addition, the I/O control 26 causes I/O multiplexer 28 to select as an output the data from the selected row. The 8 bit data contained in the row selected by the row address is output, through the I/O multiplexer 28, to the 8 bit bi-directional data bus 30. The 8 bit data obtained during a read operation is also supplied to the 1-of-8 bit selector 18.

A 16 bit pixels changed counter 32, included in the CLO processor, keeps track of and counts the number of pixels that have been changed or transformed in the first matrix. The pixels changed count is provided to the host computer through I/O multiplexer 28. The I/O multiplexer 28 is designed to selectively output on the 8 bit bi-directional data bus 30 either the pixels changed count or 8 bit data from the 64×8 RAM 16. The pixels changed counter 32 is incremented based on the exclusive OR function performed by gate 34 between bit B257, which accesses each central data point of the first matrix, and the transformation value output from the 1-of-8 bit selector 18 on output line 22. If the transformation value is different from bit B257, then gate output line 35 is asserted thus incrementing the pixels changed counter 32.

A pixel counter decoder 36 included in the CLO processor provides information related to the border of the first matrix, the last pixel input to the shift register 10, the last pixel out of shift register 10, and the first pixel out of shift register 10. The pixel counter decoder 36 makes use of a count provided by an input pixel column counter 38 and a count provided by an input pixel row counter 40. The input pixel column counter 38 and the input pixel row counter 40 includes a counter overflow line 41 which provides a counter overflow signal indicating whether the counts in the counters have exceeded the limit of the counters.

The pixel counter decoder 36 provides border related information to a border detector 42 which decodes the border related information and provides a border indication signal that indicates whether a border is present at pixel input line 44. All pixels from the first matrix are input through pixel input line 44. The border indication signal from the border detector 42 is supplied to an input data selector 46 which receives the input pixels on pixel input line 44 and border control signals on border control lines 48 and 50. The input data selector 46 selectively provides to shift register 10 either the input pixel datum appearing on input pixel line 44 or, when selected by a border indication signal from the border detector 42, border control data that vary depending on the status of the border control lines 48 and 50. When a border is detected and the input data selector 46 selects border control data, the following table describes the data supplied to shift register 10 for various states of the border control lines 48 and 50:

| Border control lines | | Border control data |
|---|---|---|
| 48 | 50 | |
| 0 | 0 | input pixel |
| 1 | 0 | $\overline{\text{input pixel}}$ |
| 0 | 1 | 0 |
| 1 | 1 | 1 |

The states of the border control lines 48 and 50 are set by the host computer under the control of a user in order to provide uniform border control conditions where a plurality of CLO processors are cascaded in a pipeline.

The pixel counter decoder 36 also provides information related to the last pixel input to shift register 10, the last pixel out of shift register 10 and the first pixel out of shift register 10. This information provided by the pixel counter decoder 36 is supplied to control signal latches 52, which also receives an input synchronization signal from sync line 54 and a clock signal from clock line 56. The input synchronization signal coordinates the operation of the CLO processor with its predecessor CLO processor, if a plurality of CLO processors are cascaded in a pipeline. The clock signal provides timing to the CLO processor for the operation of the CLO processor through a complete cycle.

The control signal latches 52 decodes the information supplied by pixel counter decoder 36 and provides various coordination signals which include a last pixel in (LPI) signal on LPI line 56, a last pixel out (LPO) signal on LPO line 58 and a first pixel out (FPO) signal on FPO line 60. The first pixel out signal also serves as an output synchronization signal for coordinating the operation of the CLO processor with its posterior CLO processor in a system where a plurality of CLO processors are cascaded in a pipeline.

Using the apparatus as described above, the present invention provides a cellular logic operation processor that works in conjunction with a host computer for performing a one-to-one transformation of all the data points from a first matrix into a corresponding number of data oints in a second matrix. The source input image or first matrix comprises a plurality of data points or pixels that are sequentially shifted through the digital storage devices of the shift register 10. A plurality of taps placed at various positions along the shift register sequentially represent 9 pixels of each 3×3 neighborhood in the image of matrix to be transformed. A neighborhood includes a central data point and a plurality of data points which surround the central data point. Each tap electrically indicates the state of one data point in the neighborhood. The taps are combined to form an address that is used to address a look-up table. The address formed by the taps access a particular location in the look-up table which has stored therein a particular transformation value. The transformation value from the look-up table is then output as a replacement or transformation value of the currently accessed central data point. The transformation value is placed in a second matrix at a location corresponding to the location in the first matrix of the currently accessed central data point.

Having described a preferred embodiment of a novel cellular operation processor in accordance with the present invention, it is believed that other modifications, variations and changes will be suggested to those skilled in the art in view of the teachings set forth herein. It is, therefore, to be understood that all such variations, modifications and changes are believed to fall within the scope of the present invention as defined by the appended claims.

What is claimed is:

1. A cellular logic operation processor for performing a one-to-one transformation of all data points having various states in a first matrix into a corresponding number of data points that make up a second matrix, said processor comprising:

a plurality of series connected digital storage devices for temporarily storing a neighborhood of data points from the first matrix, wherein said neighborhood comprises a central data point and each data point which surrounds the central data point and wherein said plurality of series connected digital storage devices are arranged in rows such that the total area of the digital storage devices is small, compact and somewhat square in shape creating a four-sided area and wherein the digital storage devices to which a plurality of taps are electrically connected are positioned along the edge of one side of the four-sided, square-shaped area;

shifting means for shifting the data points through the digital storage devices to sequentially access each neighborhood in the first matrix;

a plurality of taps at various points along the digital storage devices wherein each tap is electrically connected to a digital storage device such that the tap electrically indicates the state of the data point temporarily stored therein;

look-up table storage means having stored therein a plurality of transformation values wherein each transformation value is individually addressable by a digital address, said look-up table storage means comprising;:

row storage means having a plurality of rows of memory locations each containing a transformation value, row selector means which selects in response to a digital address a particular row of said row storage means, and bit selector means which selects in response to a digital address a memory location from the row selected wherein said memory location contains a particular transformation value;

combining means for combining at least one of the taps to form, with said electrically indicated states, a portion of a digital address for application to the row selector means and said combining means combining the remaining taps to form the remaining portion of the digital address for application to the bit selector means, to access a particular transformation value, wherein said particular transformation value is output by said processor for placement in the second matrix as a transformation of the central data point of the currently accessed neighborhood of the first matrix;

chip select and address bus means for providing to the processor a digital address from a host computer and information from a host computer indicating that said processor is selected from a plurality of processors that are cascaded in a pipeline; and address multiplexer mens for selectively providing to said row selector means a digital address from a host computer through said chip select and address bus means and a digital address from the combination of said taps through said combining means.

2. The processor of claim 1 further comprising:
a bi-directional data bus means for providing data to said processor from a host computer and supplying data from said processor to a host computer.

3. The processor of claim 2 further comprising:
pixels changed counter means for providing information to a host computer indicative of the number of data points that have been replaced by a transformation value having a state different from the state of the data point it replaces.

4. The processor of claim 2 further comprising:
input/output multiplexer means which selectively permits data to be supplied to said look-up table storage means, data to be output from said look-up table storage means and data to be output from said pixels changed counter means wherein said selected data appears on said bi-directional data bus means.

5. The processor of claim 4 further comprising:
input/output control means which is controlled by a host computer wherein said input/output control means causes said address multiplexer means to select between a digital address from said host computer and a digital address formed by a combination of taps and said input/output control means causes said input/output multiplexer means to select between data output from said pixels changed counter means, data supplied to said look-up table storage means and data output from said look-up table storage means.

6. The processor of claim 5 further comprising:

input data selector means which selectively provides to said digital storage devices input data point data and border control data.

7. The processor of claim 6 further comprising:
synchronization signal means for synchronizing the operation of said processor to a predecessor processor when a plurality of processors are cascaded in a pipeline.

8. The processor of claim 7 further comprising:
clock signal means for providing timing to the processor for the operation of the processor through a complete cycle.

9. The processor according to claim 8 further comprising:
information and synchronization circuitry means for providing information indicating that a border data point from the first matrix has been encountered, the last data point of the first matrix has been input to the digital storage devices, the last data point of the first matrix has been output from the digital storage devices and the first data point of the first matrix has been output from the digital storage devices.

10. The processor according to claim 9 wherein said information and synchronization circuitry means comprises:
input pixel column counter means which provides an output indicative of the column of the data point of the first matrix being input to said input data selector means
input pixel row counter means which provides an output indicative of the row of the data point of the first matrix being input to the input data selector means;
pixel counter decoder means which receives the output from said input pixel column counter means and the output from said input pixel row counter means and wherein said pixel counter decoder means provides information related to the border of the first matrix, the last data point input to said digital storage devices, the last data point output from said digital storage devices and the first data point output from said digital storage devices;
border detector means which receives the border related information from said pixel counter decoder means and in response thereto causes said input data selector means to selectively input to said digital storage devices input data point data and border control data; and
control signal latches means which receives said last data point input, said last data point output, and said first data point output information from said pixel counter decoder means and in response thereto provides a plurality of signals that indicate that the last data point of the first matrix has been input to the digital storage devices, the last data point of the first matrix has been output from the digital storage devices and the first data point of the first matrix has been output from the digital storage devices wherein said signal that indicates that the first data point has been output from the digital storage devices synchronizes the operation of the processor with a posterior processor when a plurality of the processors are cascaded in a pipeline.

11. A cellular logic processing method for performing a one-to-one transformation of all data points having various states in a first matrix into a corresponding number of data points in a second matrix, comprising the steps of:
providing a plurality of series connected digital storage devices for temporarily storing a neighborhood of pixels from the first matrix, wherein said neighborhood comprises a central data point and each data point which surrounds the central data point wherein said plurality of series connected digital storage devices are arranged in rows such that the total area of the digital storage devices is small, compact and somewhat square in shape creating a four-sided area and wherein the digital storage devices to which a plurality of taps are electrically connected are positioned along the edge of one side of the four-sided, square-shaped area;
providing a plurality of taps at various points along the digital storage devices wherein each tap is electrically connected to a digital storage device such that the tap electrically indicates the state of the data point temporarily stored therein;
providing a look-up table storage means having stored therein a plurality of transformation values wherein each transformation value is individually addressable by a digital address, further comprising the steps of:
providing a row storage means having a plurality of rows of memory locations each containing a transformation value,
providing a row selector means which selects in response to a digital address a particular row of said row storage means, and
providing bit selector means which selects in response to a digital address a memory location from the row selected wherein said memory location contains a particular transformation value;
sequentially shifting the pixels from the first matrix through the digital storage devices to sequentially access each neighborhood in the first matrix;
combining the taps to form, with said electrically indicated states, a digital address which is applied to the look-up table storage means to access a particular transformation value wherein the transformation value is output for placement in a corresponding location in the second matrix as the transformation value of the central data point of the currently accessed neighborhood of the first matrix, further comprising the steps of:
combining at least one of the taps to form a portion of a digital address for application to said row selector means and
combining the remaining taps to form the remaining portion of said digital address for application to the bit selector means;
providing a chip select and address bus means for providing to the processor a digital address from a host computer and information from a host computer indicating that said processor is selected from a plurality of processors that are cascaded in a pipeline; and
providing an address multiplexer means for selectively providing to said row selector means a digital address from a host computer through said chip select and address bus means and a digital address from the combination of said taps.

12. The method of claim 11 further comprising the steps of:

providing a bi-directional data bus means for providing data to the processor from a host computer and supplying data from the processor to a host computer.

13. The method of claim 12 further comprising the steps of:

providing a pixels changed counter means for providing information to a host computer indicative of the number of data points that have been replaced by a transformation value having a state different from the state of the data point it replaces.

14. The method of claim 13 further comprising the steps of:

providing an input/output multiplexer means which selectively permits data to be supplied to said look-up table storage means, data to be output from said look-up table storage means and data to be output from said pixels changed counter means wherein said selected data appears on said bi-directional data bus means.

15. The method of claim 14 further comprising the steps of:

providing an input/output control means which is controlled by a host computer wherein said input/output control means causes said address multiplexer means to select between a digital address from a host computer and a digital address formed by a combination of taps and said input/output control means causes said input/output multiplexer means to select between data output from said pixels changed counter means, data supplied to said look-up table storage means and data output from said look-up table storage means.

16. The method of claim 15 further comprising the steps of:

providing an input data selector means which selectively provides to said digital storage devices input data point data and border control data.

17. The method of claim 16 further comprising the steps of:

synchronizing the operation of the processor to a predecessor processor when a plurality of processors are cascaded in a pipeline.

18. The method according to claim 17 further comprising the steps of:

providing timing to the processor for the operation of the processor through a complete cycle.

19. The method according to claim 18 further comprising the steps of:

providing information and synchronization and circuitry means for providing information indicating that a border data point from the first matrix has been encountered, the last data point of the first matrix has been input to the digital storage devices, the last data point of the first matrix has been output from the digital storage devices and the first data point of the first matrix has been output from the digital storage devices.

20. The method according to claim 19 wherein said step providing said information and synchronization circuitry means comprises the steps of:

providing an input column pixel counter means which provides an output indicative of the column of the data point of the first matrix being input to said input data selector means;

providing input pixel row counter means which provides an output indicative of the row of the first data point of the first matrix being input to the input data selector means;

providing a pixel counter decoder means which receives the output from said input pixel column counter means and the output from said input pixel row counter means and wherein said pixel counter decoder means provides information related to the border of the first matrix, the last data point input to the digital storage devices, the last data point output from said digital storage devices and the first data point output from said digital storage devices;

providing a border detector means which receives the border related information from said pixel counter decoder means and in response thereto causes said input data selector means to selectively input to said digital storage devices input data point data and border control data; and providing a control signal latches means which receives said last data point input information, said last data point output information, and said first data point output information from said pixel counter decoder means and in response thereto provides a plurality of signals that indicate that the last data point of the first matrix has been input to the digital storage devices, the last data point of the first matrix has been output from the digital storage devices and the first data point of the first matrix has been output from the digital storage devices wherein said signal that indicates that the first data point has been output from the digital storage devices synchronizes the operation of the processor with a posterior processor when a plurality of processors are cascaded in a pipeline.

21. A cellular logic operation processor for performing a one-to-one transformation of all data points having various states in a first matrix into a corresponding number of data points that make up a second matrix, said processor comprising:

a plurality of operably connected digital storage devices for temporarily storging a neighborhood of data points from the first matrix, wherein said neighborhood comprises a central data point and each data point which surrounds the central data point;

shifting means for shifting the data points through the digital storage devices to sequentially access each neighborhood in the first matrix;

a plurality of taps at various points along the digital storage devices wherein each tap is electrically connected to a digital storage device such that the tap electrically indicates the state of the data point temporarily stored therein;

look-up table storage means having stored therein a plurality of transformation values wherein each transformation value is individually addressable by a digital address;

combining means for combining the taps to form, with said electrically indicated states, a digital address which is applied to the look-up table storage means to access a particular transformation value, wherein said particular transformation value is output by said processor for placement in the second matrix as a transformation of the central data point of the currently accessed neighborhood of the first matrix; and address multiplexer means for selectively providing to said look-up table storage means a digital address from a host computer and a digital address from the combination of said taps through said combining means.

22. A cellular logic processing method for performing a one-to-one transformation of all data points having various states in a first matrix into a corresponding number of data points in a second matrix, comprising the steps of:
providing a plurality of operably connected digital storage devices for temporarily storing a neighborhood of pixels from the first matrix, wherein said neighborhood comprises a central data point and each data point which surrounds the central data point;
providing a plurality of taps at various points along the digital storage devices wherein each tap is electrically connected to a digital storage device such that the tap electrically indicates the state of the data point temporarily stored therein;
providing a look-up table storage means having stored therein a plurality of transformation values wherein each transformation value is individually addressable by a digital address;
sequentially shifting the pixels from the first matrix through the digital storage devices to sequentially access each neighborhood in the first matrix;
combining the taps to form, with said electrically indicated states, a digital address which is applied to the look-up table storage means to access a particular transformation value wherein the transformation value is output for placement in a corresponding location in the second matrix as the transformation value of the central data point of the currently accessed neighborhood of the first matrix; and
providing an address multiplexer means for selectively providing to said look-up table storage means a digital address from a host computer and a digital address from the combination of said taps.

23. The processor of claim 21 further comprising:
a bi-directional data bus means for providing data to said processor from a host computer and supplying data from said processor to a host computer.

24. The processor of claim 23 further comprising:
pixels changed counter means for providing information to a host computer indicative of the number of data points that have been replaced by a transformation value having a state different from the state of the data point it replaces.

25. The processor of claim 24 further comprising:
input/output multiplexer means which selectively permits data to be supplied to said look-up table storage means, data to be output from look-up table storage means and data to be output from said pixels changed counter means wherein said selected data appears on said bi-directional data bus means.

26. The processor of claim 25 further comprising:
input/output control means which is controlled by a host computer wherein said input/output control means causes said address multiplexer means to select between a digital address from said host computer and a digital address formed by a combination of taps and said input/output control means causes said input/output multiplexer means to select between data output from said pixels changed counter means, data supplied to said look-up table storage means and data output from said look-up table storage means.

27. The processor of claim 26 further comprising:
input data selector means which selectively provides to said digital storage devices input data point data and border control data.

28. The processor of claim 27 further comprising:
synchronization signal means for synchronizing the operation of said processor to a predecessor processor when a plurality of processors are cascaded in a pipeline.

29. The processor of claim 28 further comprising:
clock signal means for providing timing to the processor for the operation of the processor through a complete cycle.

30. The processor according to claim 29 further comprising:
information and sychronization circuitry means for providing information indicating that a border data point from the first matrix has been encountered, the last data point of the first matrix has been input to the digital storage devices, the last data point of the first matrix has been output from the digital storage devices and the first data point of the first matrix has been output from the digital storage devices.

31. The processor according to claim 30 wherein said information and synchronization circuitry means comprises:
input pixel column counter means which provides an output indicative of the column of the data point of the first matrix being input to said input data selector means;
input pixel row counter means which provides an output indicative of the row of the data point of the first matrix being input to the input data selector means;
pixel counter decoder means which receives the output from said input pixel column counter means and the output from said input pixel row counter means and wherein said pixel counter decoder means provides information related to the border of the first matrix, the last data point input to said digital storage devices, the last data point output from said digital storage devices and the first data point output from said digital storage devices;
border detector means which receives the border related information from said pixel counter decoder means and in response thereto causes said input data selector means to selectively input to said digital storage devices input data point data and border control data; and
control signal latches means which receives said last data point input, said last data point output, and said first data point output information from said pixel counter decoder means and in response thereto provides a plurality of signals that indicate that the last data point of the first matrix has been input to the digital storage devices, the last data point of the first matrix has been output from the digital storage devices and the first data point of the first matrix has been output from the digital storage devices wherein said signal that indicates that the first data point has been output from the digital storage devices synchronizes the operation of the processor with a posterior processor when a plurality of the processors are cascaded in a pipeline.

32. The method of claim 22 further comprising the steps of:
   providing a bid-directional data bus means for providing data to the processor from a host computer and supplying data from the processor to a host computer.

33. The method of claim 32 further comprising the steps of:
   providing a pixels changed counter means for providing information to a host computer indicative of the number of data points that have been replaced by a transformation value having a state different from the state of the data point it replaces.

34. The method of claim 33 further comprising the steps of:
   providing an input/output multiplexer means which selectively permits data to be supplied to said look-up table storage means, data to be output from said look-up table storage means and data to be output from said pixels changed counter means wherein said selected data appears on said bi-directional data bus means.

35. The method of claim 34 further comprising the steps of:
   providing an input/output control means which is controlled by a host computer wherein said input-/output control means causes said address multiplexer means to select between a digital address from a host computer and a digital address formed by a combination of taps and said input/output control means causes said input/output multiplexer means to select between data output from said pixels changed counter means, data supplied to said look-up table storage means and data output from said look-up table storage means.

36. The method of claim 35 further comprising the steps of:
   providing an input data selector means which selectively provides to said digital storage devices input data point data and border control data.

37. The method of claim 36 further comprising the steps of:
   synchronizing the operation of the processor to a predecessor processor when a plurality of processors are cascaded in a pipeline.

38. The method according to claim 37 further comprising the steps of:
   providing timing to the processor for the operation of the processor through a complete cycle.

39. The method according to claim 38 further comprising the steps of:
   providing information and synchronization and circuitry means for providing information indicating that a border data point from the first matrix has been encountered, the last data point of the first matrix has been input to the digital storage devices, the last data point of the first matrix has been output from the digital storage devices and the first data point of the first matrix has been output from the digital storage devices.

40. The method according to claim 39 wherein said step providing said information and synchronization circuitry means comprises the steps of:
   providing an input column pixel counter means which provides an output indicative of the column of the data point of the first matrix being input to said input data selector means;
   providing input pixel row counter means which provides an output indicative of the row of the first data point of the first matrix being input to the input data selector means;
   providing a pixel counter decoder means which receives the output from said input pixel column counter means and the output from said input pixel row counter means and wherein said pixel counter decoder means provides information related to the border of the first matrix, the last data point input to the digital storage devices, the last data point output from said digital storage devices and the first data point output from said digital storage devices;
   providing a border detector means which receives the border related information from said pixel counter decoder means and in response thereto causes said input data selector means to selectively input to said digital storage devices input data point data and border control data; and
   providing a control signal latches means which receives said last data point input information, said last data point output information, and said first data point output information from said pixel counter decoder means and in response thereto provides a plurality of signals that indicate that the last data point of the first matrix has been input to the digital storage devices, the last data point of the first matrix has been output from the digital storage devices and the first data point of the first matrix has been output from the digital storage devices wherein said signal that indicates that the first data point has been output from the digital storage devices synchronizes the operation of the processor with a posterior processor when a plurality of processors are cascaded in a pipeline.

* * * * *